US008484349B2

(12) United States Patent
Killick et al.

(10) Patent No.: US 8,484,349 B2
(45) Date of Patent: Jul. 9, 2013

(54) DYNAMIC DSL LINE BANDWIDTH MANAGEMENT WITH THE SUBSCRIBER'S CONSENT

(75) Inventors: Raynald Killick, Alpharetta, GA (US); Timothy Ruhl, Dacula, GA (US)

(73) Assignee: Cisco Technology, Inc., San Jose, CA (US)

( * ) Notice: Subject to any disclaimer, the term of this patent is extended or adjusted under 35 U.S.C. 154(b) by 430 days.

(21) Appl. No.: 12/028,355

(22) Filed: Feb. 8, 2008

(65) Prior Publication Data

US 2009/0201946 A1    Aug. 13, 2009

(51) Int. Cl.
G06F 15/173     (2006.01)
(52) U.S. Cl.
USPC ............ 709/226; 709/224; 709/225; 709/240
(58) Field of Classification Search
USPC ........................................................ 709/226
See application file for complete search history.

(56) References Cited

U.S. PATENT DOCUMENTS

| 6,434,562 | B1* | 8/2002 | Pennywitt et al. ...................... 1/1 |
| 6,570,974 | B1* | 5/2003 | Gerszberg et al. ....... 379/218.01 |
| 6,671,724 | B1* | 12/2003 | Pandya et al. ................. 709/226 |
| 6,756,997 | B1* | 6/2004 | Ward et al. .................... 715/716 |
| 7,184,428 | B1* | 2/2007 | Gerszberg et al. ............ 370/352 |
| 7,328,450 | B2* | 2/2008 | Macrae et al. .................. 725/42 |
| 2003/0117951 | A1* | 6/2003 | Wiebe et al. .................. 370/225 |
| 2004/0199667 | A1* | 10/2004 | Dobbins ....................... 709/240 |
| 2004/0244035 | A1* | 12/2004 | Wright et al. .................... 725/32 |
| 2006/0215650 | A1 | 9/2006 | Wollmershauser et al. .. 370/389 |
| 2007/0041384 | A1 | 2/2007 | Das et al. .................... 370/395.4 |
| 2007/0053513 | A1* | 3/2007 | Hoffberg ....................... 380/201 |
| 2007/0201446 | A1 | 8/2007 | Wright ......................... 370/356 |
| 2008/0080552 | A1* | 4/2008 | Gates et al. ................... 370/468 |

FOREIGN PATENT DOCUMENTS

WO        WO 02/21841 A1    3/2002

OTHER PUBLICATIONS

European Official Action dated Dec. 14, 2011 cited in Application No. 09 707 601.3-2416; 6 pgs.

* cited by examiner

*Primary Examiner* — Richard G Keehn
(74) *Attorney, Agent, or Firm* — Merchant & Gould

(57) ABSTRACT

A system and method for allocating bandwidth to a plurality of subscriber devices operably connected to a DSL subscription network is described. An embodiment according to the invention comprises a bandwidth management system that operably connects a service network to a plurality of subscriber devices attached to a LAN. After allocating bandwidth to the plurality of subscriber services based on requirements determined from information provided by the service provider and the plurality of subscriber devices, the bandwidth management system can borrow bandwidth from non-critical subscriber services to meet the increased bandwidth requirement of other subscriber services in accordance to the subscriber's instructions. On completion of the subscriber services requiring the increased bandwidth, the bandwidth management system can reallocate bandwidth in accordance with the requirements determined from information provided by the service provider and the plurality of subscriber devices.

23 Claims, 6 Drawing Sheets

DYNAMIC DSL LINE BANDWIDTH MANAGEMENT WITH THE SUBSCRIBER'S CONSENT

FIELD OF THE INVENTION

The present invention relates to the field of bandwidth management. More particularly, embodiments of this present invention relate to managing digital subscriber line (DSL) bandwidth with user consent.

BACKGROUND

DSL network communication is an important part of today's home and office. In addition to providing services traditionally associated with a conventional computer, such as email or internet access, DSL service providers now offer many other services such as interactive program guides, viewing video-on-demand, Voice over IP (VoIP), and broadcast video of television programming, to name but a few. With ever increasing demands on the network, service providers need to balance the desire of increased data flow with the limited capacity of network resources. Bandwidth, which generally refers to one or more network resources or data pathways that may be provisioned for data flows, communication streams, or information propagation, is a critical factor in determining the success or usefulness of a DSL network. The ability to allocate bandwidth is critical for an efficient network and for ensuring that network resources are not overtaxed. When not allocated properly, the system becomes overburdened and may fail to provide promised capabilities to end users or negatively affect services and features associated with a communication protocol.

The quickest solution to an overburdened network is to ensure that every service used on the network is dedicated a portion of the total bandwidth sufficient for the needs of that service. However, dedicating bandwidth in this fashion creates efficiency challenges. Since services are not utilized equally, some being used more than others, bandwidth dedicated to a currently unused service is wasted. Ultimately, because of the unused bandwidth, fewer end users or subscribers are able to utilize the network, making it costlier for those who are able to use it.

For example, a subscriber to television services through DSL might not use the television at all during the day, but use all the bandwidth available in the evening. A bank might use all the available bandwidth during the day but dramatically reduce that usage in the evening. During these unused periods, the bandwidth allocated to the television viewer or the banker could be used by other subscribers.

Network engineers today strive to maximize efficiency by approximating minimum requisite bandwidth that properly accommodates all users. Groupings or classifications of users or services often fail to take into account specific needs of end users within a given system.

Therefore, there is a need for a method of allocating bandwidth for various services within a DSL subscriber's network to allow for normal services as well as periods of peak usage while minimizing concerns of under utilized and overburdened networks.

SUMMARY OF THE INVENTION

In order to improve services, it is desirable to have a method for allocating bandwidth within a DSL subscriber network to provide for efficient transmission of information during normal periods of traffic and also allow the end user to suspend less critical services when additional bandwidth is needed for critical services.

In one embodiment, a router/gateway (RG) allocates bandwidth to various devices in the DSL subscriber's network using default and critical rules. When a service needs bandwidth in addition to those provided in the default or critical rules, the end user can request additional bandwidth from the RG. Bandwidth dedicated to services deemed by the end user to be less critical may be reallocated to the service needing additional bandwidth. On completion of the associated service, the RG reallocates the bandwidth based on default and critical rules.

Additional advantages will be set forth in part in the description which follows or may be learned by practice. The advantages will be realized and attained by means of the elements and combinations particularly pointed out in the appended claims. It is to be understood that both the foregoing general description and the following detailed description are examples and explanatory only and are not restrictive, as claimed.

BRIEF DESCRIPTION OF THE DRAWINGS

The accompanying drawings, not drawn to scale, which are incorporated in and constitute a part of this specification, illustrate embodiments and together with the description, serve to explain the principles of the methods and systems.

DETAILED DESCRIPTION

Figure 1:
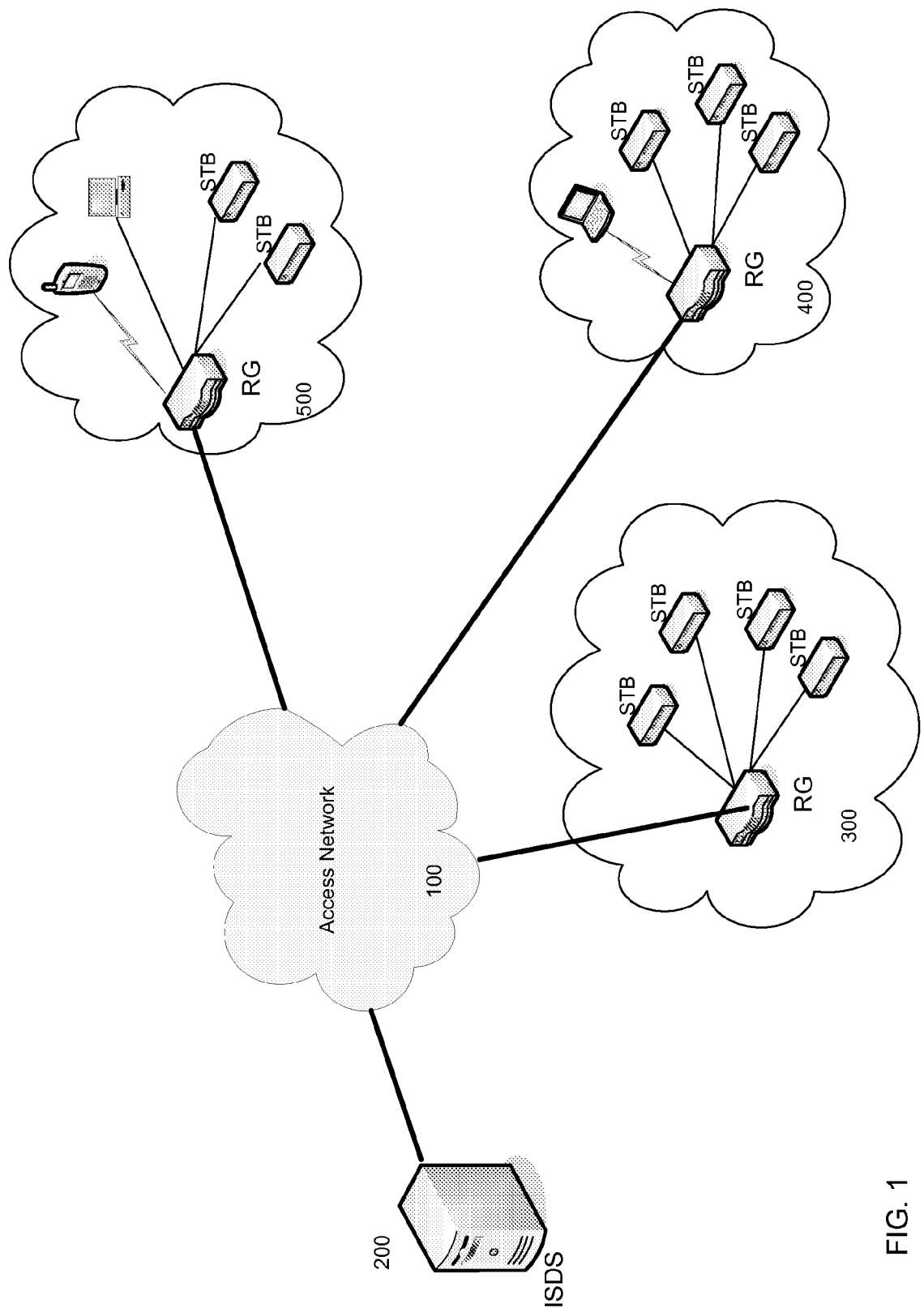
FIG. 1 illustrates an embodiment of a DSL subscriber system with three separate subscribers.

Before the present methods and systems are disclosed and described, it is to be understood that the methods and systems are not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a", "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Exemplary" means "an example of" and is not intended to convey a meaning of an ideal or preferred embodiment.

The present methods and systems may be understood more readily by reference to the following detailed description of preferred embodiments and the examples included therein and to the figures and their previous and following description.

Embodiments according to the present invention can be understood in the context of a DSL subscriber network system, where the subscriber can temporarily reallocate bandwidth from an under used service to a service that needs more bandwidth than is normally allocated to it. In accordance with the embodiments according to the present invention, the system can be implemented in software and comprises an ordered listing of executable instructions for implementing logical functions. The software may reside in the RG and can be accessible through other devices networked to the RG. For example, a subscriber may access the software through a set-top-box (STB), computer, or any device attached to the network that is capable of sending and receiving instructions to and from the RG.

In one embodiment, a subscriber may send to and receive instructions from the system through a user interface (UI). This UI may be part of the software system and may reside in the RG. A subscriber may access the UI from a STB or computer by sending a request to the RG. Through the UI, the RG lists the services that have bandwidth available for reallocation. Using this list, the subscriber, through the GUI, may request the bandwidth of a specific service be reduced and the newly available bandwidth be allocated to a specific service identified by the subscriber.

FIG. 1 illustrates a simplified non-limiting example of DSL subscriber systems. In this example, a service provider 200 provides multiple services to a plurality of subscribers 300, 400, 500. Each subscriber 300, 400, 500 access the wide area network (WAN) 100 through a RG. Each RG then distributes the services subscribed to the various devices attached to its LAN.

Figure 2:
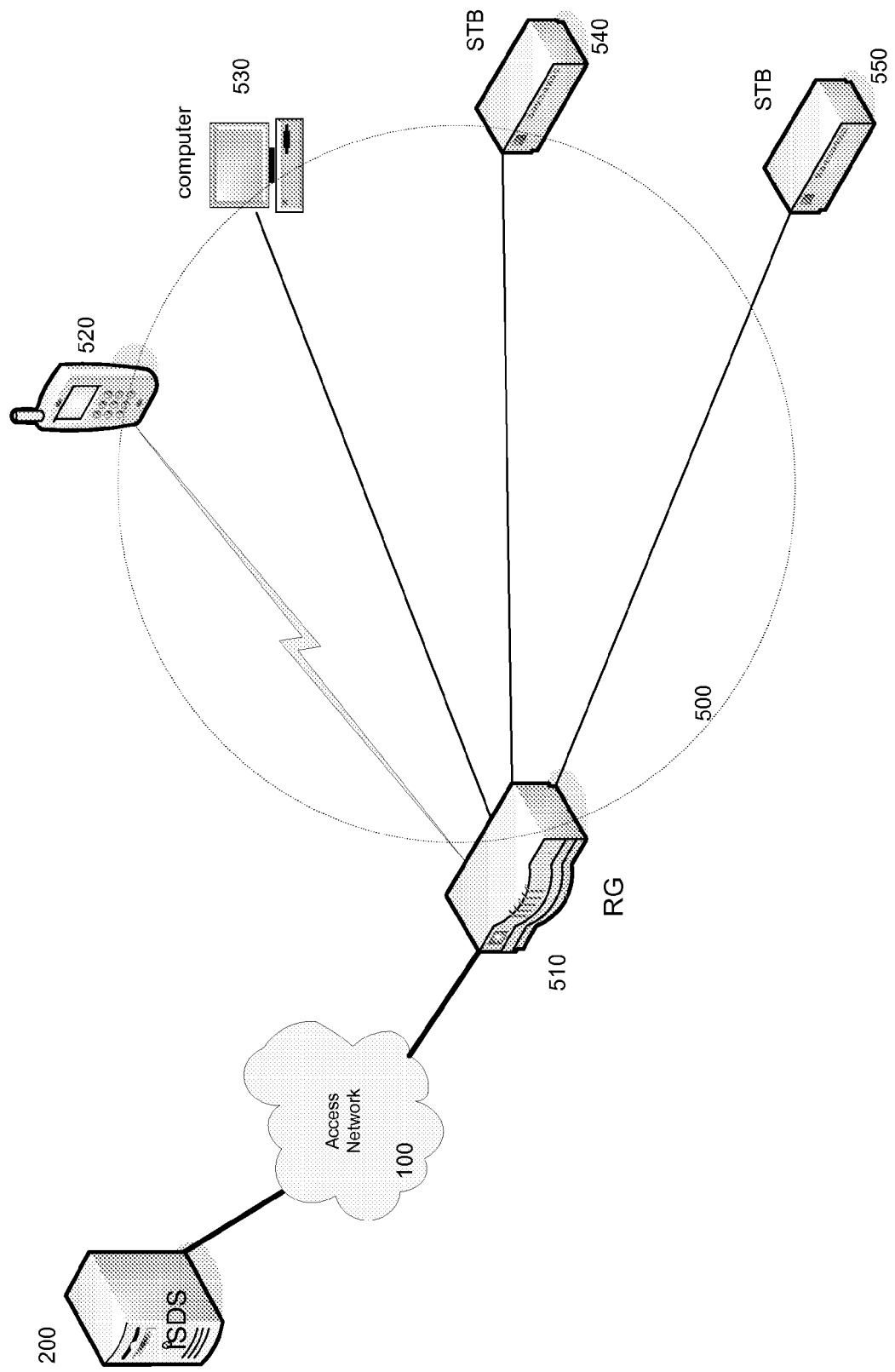
FIG. 2 illustrates an embodiment of one DSL subscriber system.

FIG. 2 illustrates a simplified non-limiting example of one DSL subscriber system. In this embodiment, on initialization, the RG 510 may assign bandwidth to devices 520, 530, 540, 550 attached to its LAN 500 according to default and critical bandwidth rules. In one embodiment, the default and critical bandwidth rules comprise information sent by the service provider 200 to the RG 510 with information concerning the subscription services being provided and the available resources for each service. In another embodiment, the default and critical rules can be created from information received from the service provider in combination with information from the individual subscriber devices 520, 530, 540, 550. In either case, the default rules generally provide for the minimum required bandwidth for normal service operations for the subscriber devices 520, 530, 540, 550. In one embodiment, the critical bandwidth rules comprise the bandwidth allocations that are critical to the functions of the network or the subscriber and may not be reduced. For example, critical bandwidth may be related to services for VoIP, emergency services, or network administrative functions required to maintain the integrity of the communication pathway between the subscriber device 520, 530, 540, 550 and the RG 510, to name but a few.

Figure 3A:
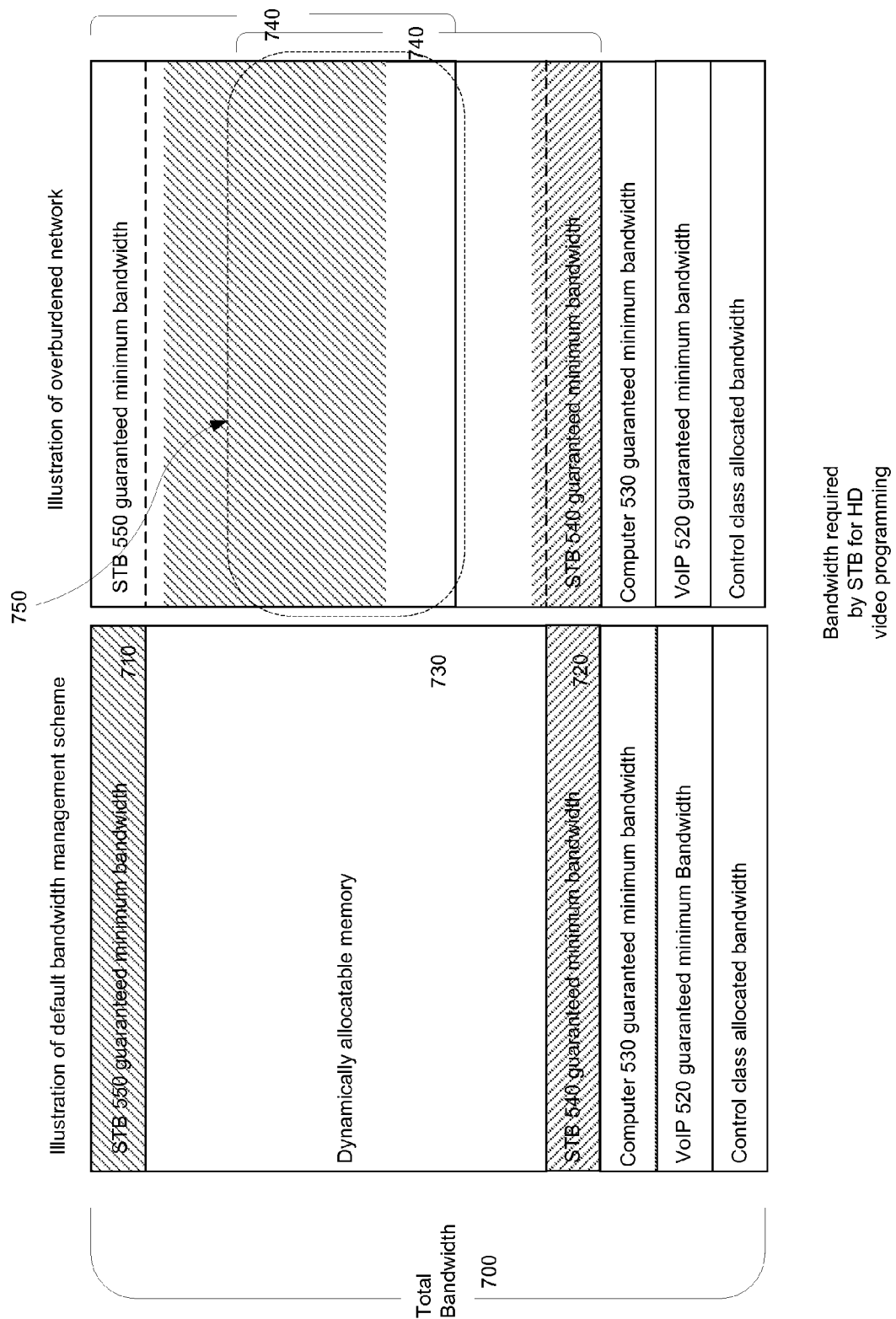
FIG. 3a illustrates an embodiment of the bandwidth management requirements of the DSL subscriber system of FIG. 2 and the possible overburdening of the network.

FIG. 3a illustrates a non-limiting simplified example of bandwidth allocation using a default bandwidth rule for the system illustrated in FIG. 2. In this embodiment, the total bandwidth allotted 700 by the service provider to the subscriber is allocated by RG 510 to the subscriber devices 520, 530, 540, 550. The STBs 540, 550 are allocated sufficient bandwidth 710, 720 to allow for viewing standard definition (SD) broadcast video programming in addition to other various services. The system may become overburdened if a subscriber attempts to access services that require more bandwidth than is available for that subscriber device. For example, when both STBs 540, 550 download HD video programs, both STBs 540, 550 may utilize the dynamically available bandwidth 730 for their additional bandwidth needs. However, if each STB 540, 550 require more bandwidth 740 than is available, the system becomes overburdened because of the conflicting bandwidth needs 750.

Figure 3B:
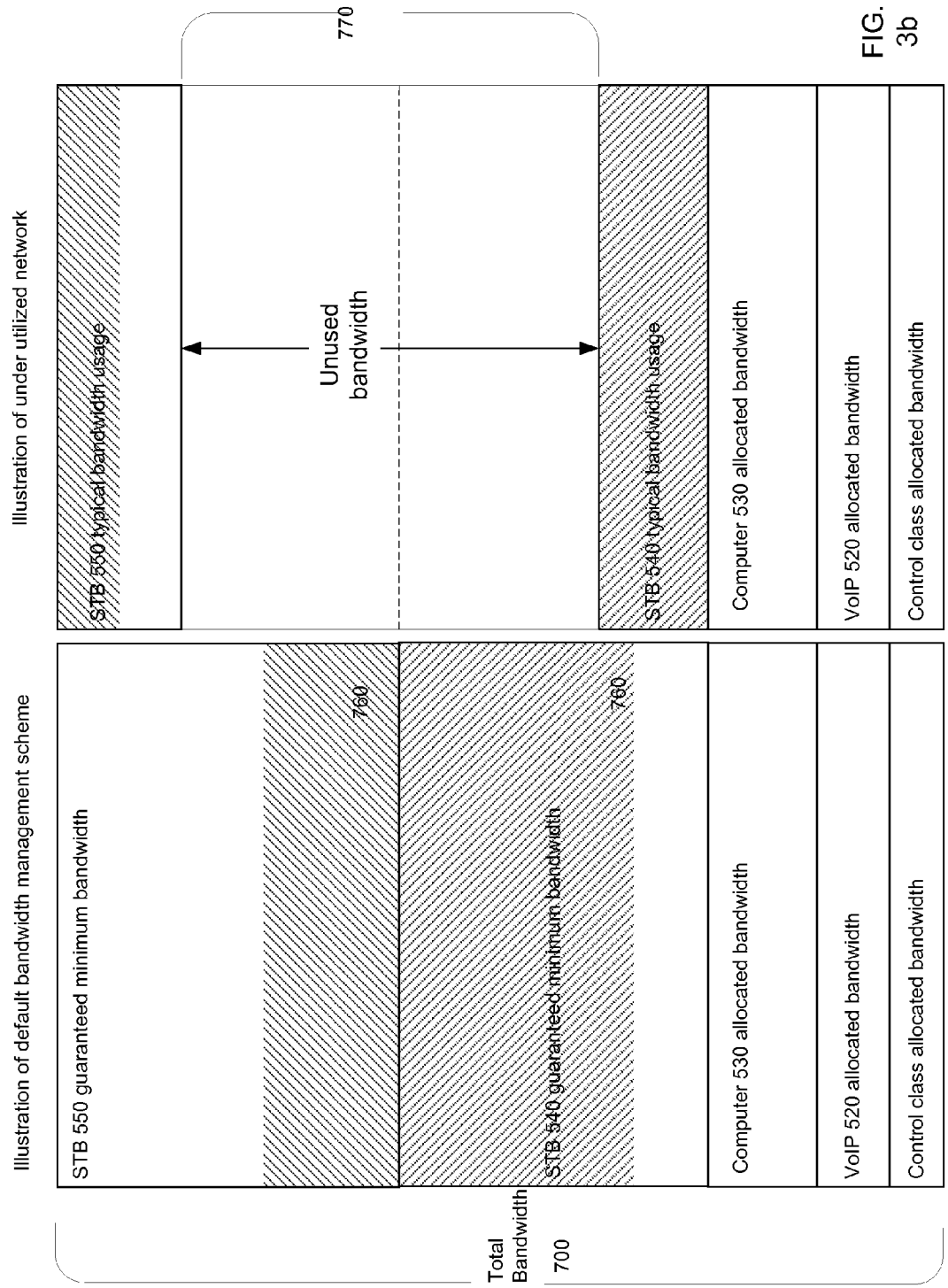
FIG. 3b illustrates an embodiment of an inefficient network.

FIG. 3b illustrates a non-limiting simplified example of bandwidth allocation using a default bandwidth rule for the system illustrated in FIG. 2. In this embodiment, the bandwidth available 700 to the RG 510 is divided between the subscriber devices 520, 530, 540, 550. STBs 540, 550 are allocated sufficient bandwidth 760 to allow for viewing broadcast video programming in addition to downloading HD programming. When the STBs 540, 550 are not downloading HD programming, the additional bandwidth 770 is under utilized.

Figure 3C:
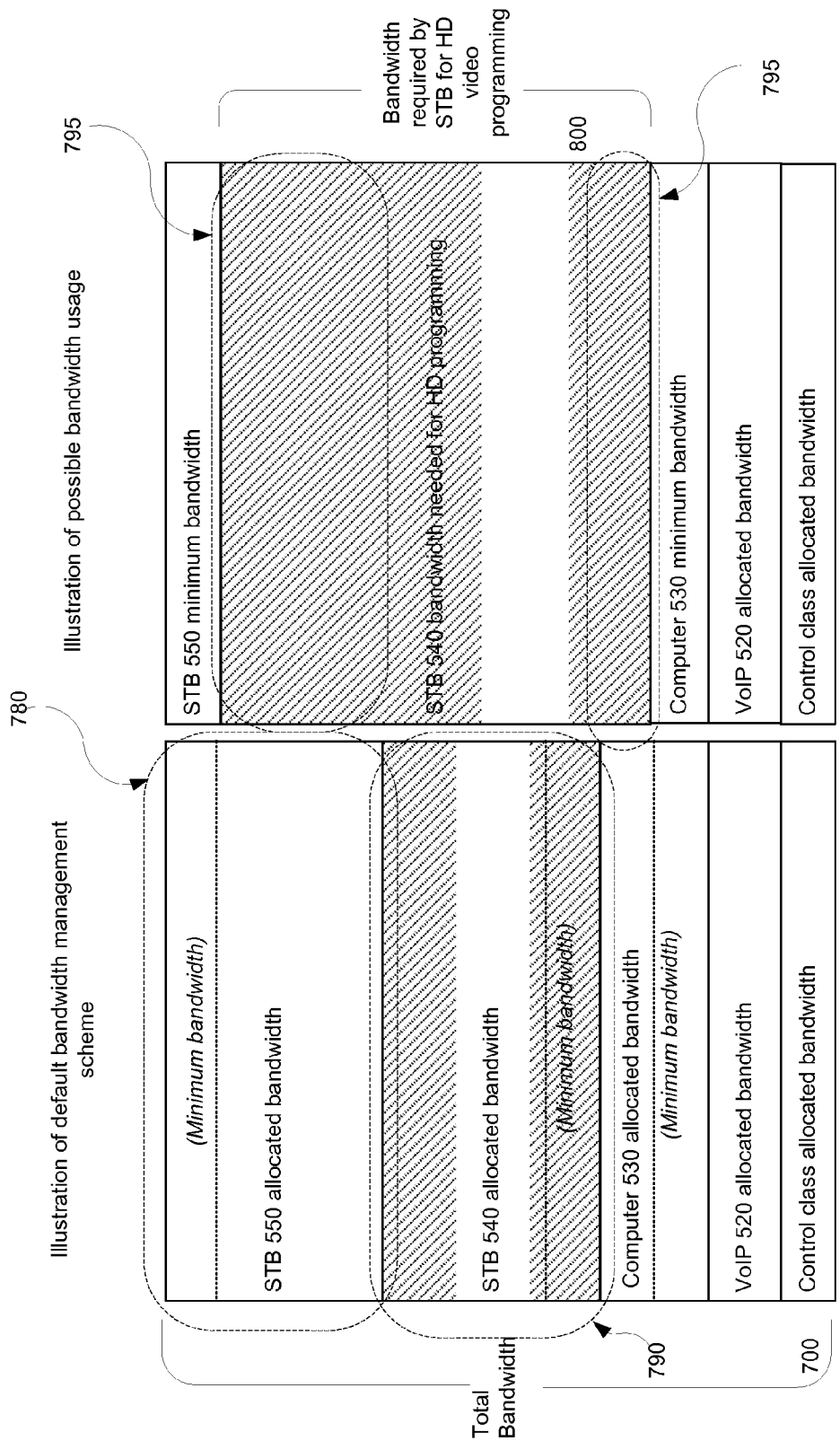
FIG. 3c illustrates an embodiment of the bandwidth reallocation according to an aspect of the present invention.

FIG. 3c illustrates a non-limiting simplified example of bandwidth allocation using a default bandwidth rule for the system illustrated in FIG. 2. In this embodiment, the bandwidth available 700 to the RG 510 is divided between the subscriber devices 520, 530, 540, 550. The STBs 540, 550 are allocated sufficient or minimum bandwidth 780, 790 to allow for access to SD broadcast video programming in addition to other services but not enough bandwidth for downloading HD video programming. However, the system is not overburdened when the subscriber attempts to download a HD program from a STB 540 because additional bandwidth 795 is borrowed from other devices 530, 550. While this may limit or even suspend the functions of the other devices 530, 550, the subscriber can perform the desired HD programming downloads 800 without overburdening the network. Additionally, because different subscriber devices 530, 540, 550 are able to borrow additional bandwidth when necessary, allocating sufficient bandwidth for HD programming to both STBs 540, 550 is not needed thus reducing the likelihood that the allocated bandwidth is under utilized as in FIG. 3b.

Figure 4:
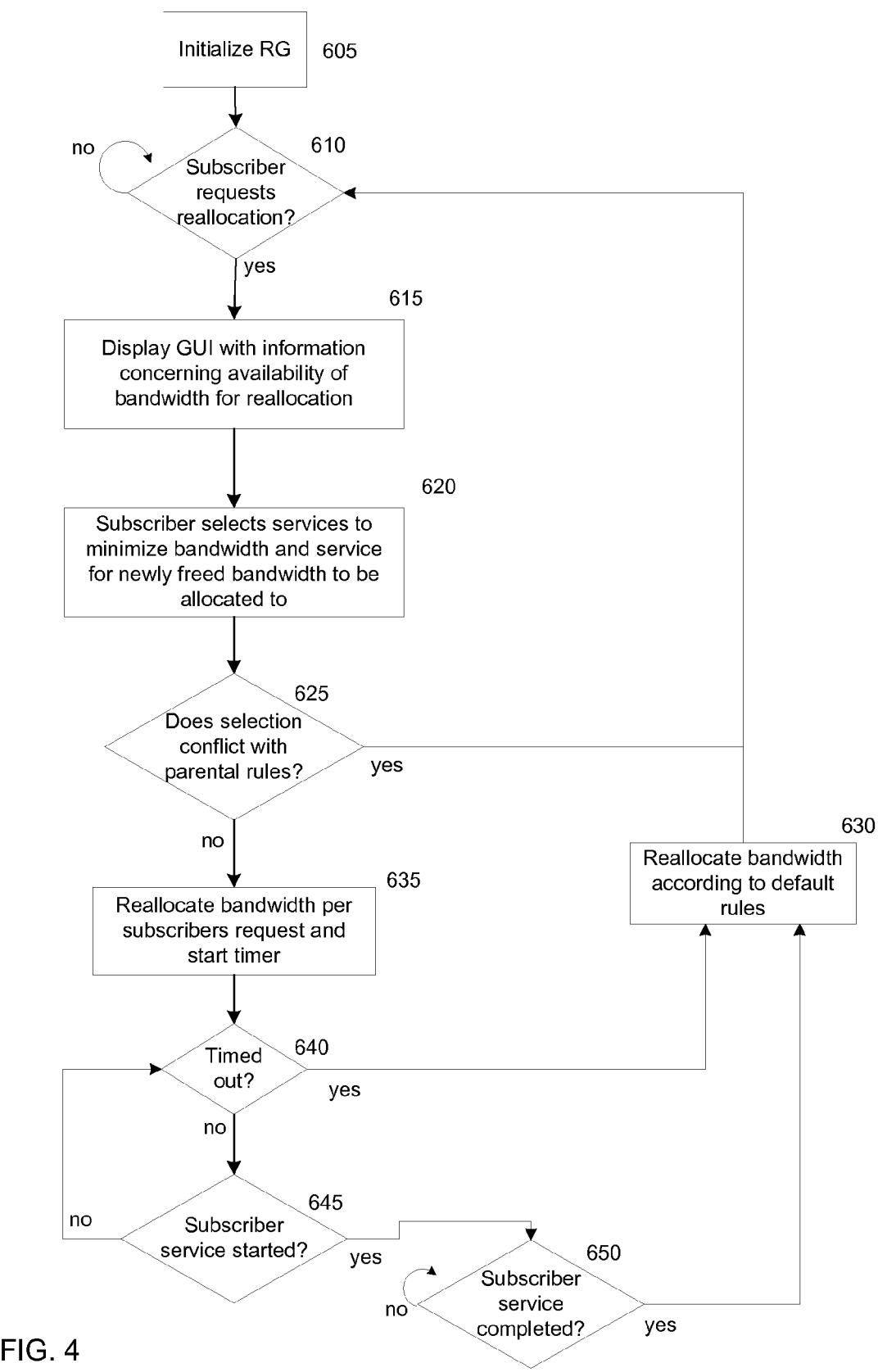
FIG. 4 illustrates an exemplary flow chart describing the steps associated with the logic used by the bandwidth management system, according to one embodiment.

FIG. 4 illustrates an embodiment of a flow chart of the logic used by the invention. In this embodiment, at block 605, the RG 510 allocates bandwidth resource to the subscriber devices per default and critical rules upon power up or other initialization. The RG 510 provides communication pathways between the subscriber devices 520, 530, 540, 550 and the access network 100 based on the available bandwidth, default and critical rules. Upon a request in block 610, from the subscriber, information in the form of a UI is sent, in block 615, by the RG 510 to the device 520, 530, 540, 550 used by the subscriber in making the request. At block 620, the subscriber selects from the UI, the service requiring additional bandwidth and selects one or more service(s) from a plurality of services whose bandwidth may be reduced.

In one embodiment, the UI may only display allocated bandwidth that can be reallocated, excluding bandwidth setup as part of the critical bandwidth rules. In another embodiment, the UI may display all allocated bandwidth including those associated with the critical bandwidth rules but not allow the subscriber to alter any allocated bandwidth associated with the critical bandwidth rules.

In accordance with embodiments according to the present invention, prior to reallocating the bandwidth as specified by the subscriber, in block 625, the bandwidth management system checks the reallocation request with the parental rules to ensure that the request is within the limits of the parental rules. If the reallocation request is outside of the limits setup by the parental rules, the bandwidth management system may notify the subscriber of the limitation and wait for a request for a different reallocation in block 615, which complies with the parental rules. In an alternative embodiment according to the invention, the bandwidth management system, after notifying the subscriber of the parental rules limitation, cancels the reallocation request and waits for new subscriber request in block 610. Non-limiting examples of limitations that can be imposed on the reallocation of bandwidth through the parental rules may include but are not limited to the time in the day or week where reallocation of one or more subscriber services may not be reallocated or restrictions on how much bandwidth one or more subscriber services is allowed to use at any given time. Note, while this embodiment uses parental rules, these rules are not necessary for the practice of the invention. Additionally, if the parental rules are used, they can be left undefined by the subscriber. In this instance, undefined parental rules may be treated by the bandwidth management system as an indication of no limitations on how bandwidth is to be reallocated, other than those in the critical bandwidth rules. In one embodiment, if the reallocation is within the limits defined by the parental rules, the bandwidth management system in block 635, may reallocate bandwidth as requested by the subscribe. Also in block 635, on reallocation, the bandwidth management system may start a timer. If the reallocated bandwidth is not utilized by the service indicated in the subscriber's request within a predetermined time period, the bandwidth is reallocated based on the default and critical bandwidth in block 630. In one embodiment according to the invention, the time period may be specified through a plurality of methods including but not limited to, subscriber input as part of an initialization or on going process, input from the service provider 200 or generated by RG 510 internal logic.

In accordance with the embodiments according to the present invention, if the reallocated bandwidth is used by the subscriber service indicated in the request prior to timing out, the bandwidth management system in block 650, manages the bandwidth such that the subscriber service is allocated the bandwidth until the completion of the service. Once the subscriber service has completed, in block 630, the bandwidth management system may reallocate bandwidth to all services in the LAN based on the default and critical bandwidth rules.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as examples only, with a true scope and spirit being indicated by the following claims.

What is claimed is:

1. A method for dynamically managing subscriber bandwidth over a DSL network with a subscriber's consent comprising:
   determining bandwidth provided to the subscriber from a service provider;
   determining bandwidth requirement default rules and critical rules for a plurality of subscriber devices, the default rules comprising information provided by the service provider concerning minimum bandwidth requirements for a service, the critical rules comprising information concerning bandwidth allocation critical to network functionality;
   allocating the provided bandwidth to each of the plurality of subscriber devices in accordance with the bandwidth requirement default rules and the critical rules;
   receiving, after allocation, from the subscriber, a request for additional bandwidth for at least one of the plurality of devices;
   sending, to the subscriber, a list of non-critical active services with their current bandwidth utilization and availability for preemption, the list comprising bandwidth allocated to each of the non-critical services, and a bandwidth available for preemption for each of the non-critical services, wherein bandwidth available for preemption excludes bandwidth assigned according to the critical rules;
   receiving, from the subscriber, a selection of at least one service from the list of non-critical active services with bandwidth to be preempted;
   verifying whether the selected preempt service bandwidth complies with the bandwidth requirement default rules and critical rules;
   rejecting the subscriber selection if the selected preempt services do not meet the bandwidth requirement default rules and critical rules; and
   allocating bandwidth from the selected preempt services to the at least one of the plurality of subscriber devices requested by the subscriber.

2. The method of claim 1, wherein determining bandwidth requirement default rules for the plurality of subscriber devices comprises determining the bandwidth requirement of a plurality of devices including set-top boxes, modems, personal computers, and IP communication devices.

3. The method of claim 1, wherein allocating the bandwidth to the at least one of the plurality of subscriber devices comprises:
   preempting a portion of the bandwidth requirement default rules not part of a critical service; and
   prohibiting the preemption of bandwidth utilized by critical services.

4. The method of claim 3, wherein the critical service includes emergency alert systems, 911 services and communication necessary to maintain the integrity of the DSL network.

5. The method of claim 3, wherein preempting the portion of the bandwidth requirement default rules not part of critical services comprises:
   shutting down preempted services and freeing up the associated bandwidth for use by other services;

monitoring traffic usage to ensure that newly freed bandwidth is being used in accordance with subscriber bandwidth management rules;

reallocating bandwidth in accordance with the bandwidth requirement default rules if the newly freed bandwidth is not used after a timeout period; and reallocating bandwidth according to the bandwidth requirement default rules when the subscriber service using bandwidth in accordance with the subscriber bandwidth management rules has completed the service requiring the preempted bandwidth.

6. The method of claim 1, further comprising receiving parental rules from the subscriber, wherein the parental rules are limitations on subscriber services that may be preempted.

7. The method of claim 6, further comprising:
verifying whether the selected preempt service bandwidth complies with the bandwidth requirement default rules and critical rules; and
rejecting the user selection if the selected preempt service bandwidth does not comply with the parental control rules.

8. The method of claim 6, wherein the parental rules are defined by the subscriber and comprises a restriction on how much bandwidth each of the plurality of services is allowed to use at any given time.

9. A system for allocating bandwidth in a DSL network, comprising:
a bandwidth management device comprising a user interface, wherein the bandwidth management device is operably connected with a network; and
a plurality of subscriber devices operably connected with the bandwidth management device, wherein the bandwidth management device:
determines bandwidth provided to a subscriber from a service provider through the network;
determines bandwidth requirement default rules and critical rules for the plurality of subscriber devices, the default rules comprising information provided by the service provider concerning minimum bandwidth requirements for a service, the critical rules comprising information concerning bandwidth allocation critical to network functionality;
allocates the provided bandwidth to each of the plurality of subscriber devices in accordance with the bandwidth requirement default rules and the critical rules;
receives, after allocation, a request for additional bandwidth for at least one of the plurality of devices from the subscriber through the user interface;
sends to the user interface, information concerning the bandwidth available for reallocation a list of non-critical active services, the information comprising bandwidth allocated to each of the non-critical services, and a bandwidth available for preemption for each of the non-critical services, wherein bandwidth available for preemption excludes bandwidth assigned according to the critical rules;
receives from the user interface, a subscriber selection comprising a list of subscriber services with bandwidth to be preempted, wherein receiving the list of subscriber services with bandwidth to be preempted comprises receiving a list of under used services;
receives from the user interface, a subscriber service to be allocated the preempted bandwidth, wherein receiving the subscriber service to be allocated the preempted bandwidth comprises receiving the service based on the service needing more bandwidth than is normally allocated to the service;
ignores the subscriber selection if it violates rules limiting the allocation of bandwidth or guaranteed minimum requirements of critical services; and
allocates the bandwidth from the selected preempt services to the at least one of the plurality of subscriber devices requested by the subscriber.

10. The system claim of 9, wherein the user interface is accessible from the bandwidth management device and from the plurality of subscriber devices.

11. The system claim of 9, wherein the bandwidth management device determining bandwidth provided to the subscriber from the service provider through the network comprises the bandwidth management device receiving bandwidth information from the service provider.

12. The system claim of 9, wherein the bandwidth management device determining bandwidth requirement default rules for the plurality of subscriber devices comprises the bandwidth management device allocating bandwidth to a subscriber device based on bandwidth requirements which include rules defining critical services with a guaranteed minimum bandwidth.

13. The system claim of 12, wherein critical services include emergency services and communication necessary to maintain operability for the DSL network.

14. The system claim of 9, wherein rules limiting the allocation of bandwidth further comprises rules based on subscriber determined factors.

15. The system claim of 9, wherein the bandwidth management device allocates the provided bandwidth to each of the plurality of subscriber devices in accordance with subscriber bandwidth management rules and the bandwidth requirement default rules for the plurality of subscriber devices comprises:
allocating bandwidth from the list of subscriber services with bandwidth to be preempted to a subscriber service to be allocated the preempted bandwidth;
allocating bandwidth to the subscriber devices based on default rules and guaranteed minimum bandwidth rules for critical services if the subscriber service to be allocated the preempted service does not use the preempted bandwidth within a timeout period; and
allocating bandwidth to the subscriber devices according to bandwidth management default rules and guaranteed minimum bandwidth rules for critical services when the subscriber service to be allocated the preempted bandwidth has completed the service requiring the preempted bandwidth.

16. The system of claim 9, wherein the bandwidth management device further receives a parental rule from the subscriber through the user interface wherein the parental rule comprises restriction on how much bandwidth each of the plurality of services is allowed to use at any given time.

17. A device for allocating bandwidth in a DSL network, comprising:
a user interface;
a DSL connection operably connecting the device to a DSL network;
a plurality of subscriber device connections, wherein the device operably connects with a plurality of subscriber devices; and
a processor operably connected with the user interface, the DSL connection, and the plurality of subscriber device connections, wherein the processor is configured to:
determine bandwidth provided to a subscriber from a service provider through the DSL network;
determine bandwidth requirement default rules and critical rules for the plurality of subscriber device connections, the default rules comprising information provided by the service provider concerning minimum bandwidth requirements for a service, the critical rules comprising information concerning bandwidth allocation critical to network functionality;

allocate the provided bandwidth to each of the plurality of subscriber devices in accordance with the bandwidth requirement default rules and the critical rules;

receive, after allocating, a request for additional bandwidth for at least one of the plurality of devices from the subscriber through the user interface, the receipt comprising:

send to the user interface information concerning the bandwidth available for reallocation, the information comprising bandwidth allocated to each of the non-critical services, and a bandwidth available for preemption for each of the non-critical services, wherein bandwidth available for preemption excludes bandwidth assigned according to the critical rules;

receive from the user interface, a list of subscriber services with bandwidth to be preempted, wherein receiving the list of subscriber services with bandwidth to be preempted comprises receiving a list of under used services;

receive from the user interface, a subscriber service to be allocated the preempted bandwidth, wherein receiving the service to be allocated the preempted bandwidth comprises receiving the service based on the service needing more bandwidth than is normally allocated to the service; and ignore the subscriber selection if they violate rules limiting the allocation of bandwidth or guaranteed minimum bandwidth requirements for critical services; and allocate the preempted bandwidth to the subscriber service to be allocated the preempted bandwidth.

18. The device of claim 17, wherein the processor is configured to determine bandwidth provided to the subscriber from the service provider through the DSL network comprises the processor being further configured to receive from the service provider bandwidth information in accordance to a subscriber's DSL subscription.

19. The device claim of 17, wherein the processor is configured to determine bandwidth requirement default rules for the plurality of subscriber device connections comprises the processor being further configured to include bandwidth requirements for critical services with guaranteed minimum bandwidth.

20. The device claim of 19, wherein critical services comprises emergency services and communication necessary to maintain operability of the DSL network.

21. The device claim of 17, wherein the processor is configured to allocate the preempted bandwidth to the subscriber service to be allocated the preempted bandwidth in accordance with the bandwidth requirement default rules comprises the processor being further configured to:

allocate bandwidth, from the list of subscriber services with bandwidth to be preempted, to the service the subscriber has designated to receive the preempted bandwidth;

allocate bandwidth to the plurality of subscriber devices based on bandwidth requirement default rules if the subscriber service to be allocated the preempted service does not use the preempted bandwidth within a timeout period; and allocating bandwidth to the plurality of subscriber devices based on bandwidth requirement default rules when the subscriber service to be allocated the preempted bandwidth has completed the service requiring the preempted bandwidth.

22. The device claim of 17, wherein the user interface is accessible from the device and from the plurality of subscriber devices.

23. The device of claim 17, wherein the processor is further configured to receive a parental rule from the subscriber through the user interface wherein the parental rule comprises restriction on how much bandwidth each of the plurality of services is allowed to use at any given time.

* * * * *